United States Patent [19]

Eyuboglu

[11] Patent Number: 4,833,693
[45] Date of Patent: May 23, 1989

[54] CODED MODULATION SYSTEM USING INTERLEAVING FOR DECISION-FEEDBACK EQUALIZATION

[75] Inventor: Vedat M. Eyuboglu, Boston, Mass.
[73] Assignee: Codex Corporation, Mansfield, Mass.
[21] Appl. No.: 800,529
[22] Filed: Nov. 21, 1985
[51] Int. Cl.⁴ .............................................. H04B 1/10
[52] U.S. Cl. ........................................ 375/34; 375/14; 375/99; 371/43
[58] Field of Search ............ 370/19; 375/14, 58, 375/99, 11, 12, 34, 101, 102; 371/43, 44, 45; 333/18, 28 R

[56] References Cited

U.S. PATENT DOCUMENTS

| | | | |
|---|---|---|---|
| 3,648,265 | 3/1972 | Kobayashi et al. | 340/174.1 G |
| 3,652,998 | 3/1972 | Forney, Jr. | 340/172.5 |
| 4,077,021 | 2/1978 | Csajka et al. | 322/9 R |
| 4,087,626 | 5/1978 | Brader | 178/22 |
| 4,312,070 | 1/1982 | Coombes et al. | 371/45 |
| 4,439,082 | 1/1985 | Cumberton et al. | 371/43 |
| 4,445,216 | 4/1984 | Kobari et al. | 371/39 |
| 4,489,418 | 12/1984 | Mazo | 375/39 |
| 4,539,684 | 9/1985 | Kloker | 371/45 |
| 4,562,426 | 12/1985 | Forney, Jr. | 340/347 DD |
| 4,631,735 | 12/1986 | Qureshi | 375/34 |
| 4,713,817 | 12/1987 | Wei | 375/39 |
| 4,713,829 | 12/1987 | Eyuboglu | 375/37 |

OTHER PUBLICATIONS

Ungerboeck, "Channel Coding with Multilevel/Phase Signals", IEEE Transactions on Information Theory, vol. IT-28, No. 1, Jan. 1982, pp. 55-67.

Forney, "The Viterbi Algorithm", Proceedings of the IEEE, vol, 61, No. 3, Mar. 1973, pp. 268-278.

Qureshi, "Adaptive Equalization", IEEE Communications Magazine, Mar. 1982, pp. 9-16.

Belfiore & Parks, "Decision Feedback Equalization", Proceedings of the IEEE, vol. 67, No. 8, Aug. 1979, pp. 1143-1156.

Falconer, "Application of Passband Decision Feedback Equalization in Two-Dimensional Data Communication Systems", IEEE Transactions on Communications, Oct.1 1976, pp. 1159-1166.

Ramsey, "Realization of Optimum Interleavers", IEEE Transactions on Information Theory, vol. IT-16, No. 3, May 1970, pp. 338-345.

*Primary Examiner*—Robert L. Griffin
*Assistant Examiner*—Andrew J. Telesz, Jr.

[57] ABSTRACT

In a communication system, the combined advantages of decision feedback equalization and delayed decoding are achieved in a receiver by interleaving the signal points at the transmitter, and deinterleaving them at the receiver so that sufficiently reliable delayed decoder decisions can be used in estimating the distortion component of the received signal presently being processed in the decision feedback circuit.

11 Claims, 5 Drawing Sheets

| 200 — SIGNALING INTERVAL | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 202 — SIGNAL POINTS IN SEQUENCE 24 | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | $S_{13}$ | $S_{14}$ | $S_{15}$ | $S_{16}$ | $S_{17}$ | $S_{18}$ |
| 204 — INTERLEAVER DELAY | 0 | 6 | 2 | 8 | 4 | 0 | 6 | 2 | 8 | 4 | 0 | 6 | 2 | 8 | 4 | 0 | 6 | 2 |
| 206 — INTERLEAVED SEQUENCE 28 | $S_1$ | — | — | — | $S_3$ | $S_6$ | — | $S_2$ | $S_5$ | $S_8$ | $S_{11}$ | $S_4$ | $S_7$ | $S_{10}$ | $S_{13}$ | $S_{16}$ | $S_9$ | $S_{12}$ |
| 208 — NOISE SAMPLES AT THE DEINTERLEAVER INPUT | $N_1$ ][ $N_2$ | $N_3$ | $N_4$ | $N_5$ | $N_6$ ][ $N_7$ | $N_8$ | $N_9$ | $N_{10}$ | $N_{11}$ ][ $N_{12}$ | $N_{13}$ | $N_{14}$ | $N_{15}$ | $N_{16}$ ][ $N_{17}$ | $N_{18}$ |
| 210 — DEINTERLEAVER DELAY | 8 | 0 | 2 | 4 | 6 | 8 | 0 | 2 | 4 | 6 | 8 | 0 | 2 | 4 | 6 | 8 | 0 | 2 |
| 212 — DEINTERLEAVED SIGNAL POINT * | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | $S_{13}$ | $S_{14}$ | $S_{15}$ | $S_{16}$ | $S_{17}$ | $S_{18}$ |
| 214 — DEINTERLEAVED NOISE SAMPLES * | $N_1$ | $N_8$ | $N_5$ | $N_{12}$ | $N_9$ | $N_6$ | $N_{13}$ | $N_{10}$ | $N_{17}$ | $N_{14}$ | $N_{11}$ | $N_{18}$ | $N_{15}$ | $N_{22}$ | $N_{19}$ | $N_{16}$ | $N_{23}$ | $N_{20}$ |

*EXCLUDING A DELAY OF 8

CODED MODULATION SYSTEM USING INTERLEAVING FOR DECISION-FEEDBACK EQUALIZATION

BACKGROUND OF THE INVENTION

This invention relates to coded, carrier-modulated data communication systems in which dependencies are introduced between successive transmitted signal points and the receiver delays its final decision on each received signal in order to take into account subsequently received signals.

In typical such coded systems (for example the systems described in Csajka et al., U.S. Pat. No. 4,077,021, and Ungerboeck, "Channel Coding with Multilevel/Phase Signals", IEEE Transactions on Information Theory, Vol. IT-28, No. 1, January, 1982) the receiver uses a Viterbi algorithm trellis decoder (of the kind described in Forney, "The Viterbi Algorithm", Proceedings of the IEEE, 61(3):268 (March 1973), incorporated herein by reference) to decode a sequence of received signals into the sequence of signal points that is closest to the sequence of received signals in the sense of the algebraic sum of squared Euclidean distances. Final decisions from the decoder are delayed for a sufficient number of signaling intervals to assure to an acceptably high probability that the sequence of which signal points were sent will be correctly decided.

Typical receivers also include equalizers to reduce the effects of intersymbol interference introduced by the channel, as described in Qureshi, "Adaptive Equalization", IEEE Communications Magazine, March, 1982, incorporated herein by reference. For channels with severe amplitude distortion, the typical linear transversal equalizer used in quadrature amplitude modulation (QAM) systems enhances noise and correlates the noise samples (i.e., the noise components in the respective received signals) in successive intervals. In coded systems using the conventional Viterbi algorithm decoder, such noise correlation can significantly increase the probability of making decision errors.

In conventional so-called uncoded systems, a decision feedback type equalizer (DFE) can be substituted for the linear equalizer to perform equalization with less noise enhancement, and without correlating noise samples. Generally, a DFE multiplies previous decisions by feedback coefficients and sums the products to produce a valve to be applied to the demodulated, partly equalized, received signal to correct for the anticipated intersymbol interference (due to previous signal points) in the currently received signal. DFEs are described in the Qureshi article cited above, in C. A. Belfiore and J. H. Park, Jr., "Decision Feedback Equalization", Proceedings of the IEEE, August, 1979, and in D. D. Falconer, "Application of Passband Decision Feedback Equalization in Two-Dimensional Data Communication Systems", IEEE Transactions on Communications, October, 1976, all incorporated herein by reference.

An alternative form of DFE (called a noise predictor) can be used to predict and compensate for the noise component in the received signal at the feedforward linear equalizer output, as described in the Belfiore and Park article. The noise predictor output is a weighted sum of past error signals (each based on a comparison of a past received signal with the corresponding decision), where the weighting coefficients are selected to minimize the average power of the residual noise signals after prediction by removing the correlation which exists between successive error signals before prediction. Unlike the conventional-form DFEs, in noise predictors the coefficients of the linear (or forward) equalizer are independent of the predictor (or feedback) coefficients and the forward equalizer coefficients can be updated to minimize the mean square error before prediction as in a conventional linear equalizer.

In using decision-feedback techniques with conventional uncoded systems, the decisions required for feedback are available without delay. In coded systems, however, reliable decisions are available only after some delay; and tentative decisions, which may be available with little or no delay, are generally unreliable and would result in excessive error propagation which would eliminate the performance advantage of decision-feedback equalization.

Two techniques for applying decision feedback techniques to Viterbi algorithm decoding are disclosed in Qureshi, U.S. Pat. No. 4,631,735 issued Dec. 23, 1986, and in Eyuboglu, U.S. Pat. No. 4,713,829 issued Dec. 15, 1987, both assigned to the same assignee as this application, and incorporated herein by reference. In the Qureshi application, the receiver associates a separate decision-feedback noise predictor circuit with each possible state of the Viterbi decoder. In the Eyuboglu application, the receiver associates decision-feedback noise predictor circuits with so-called decision subsets. In both cases, the predictors use appropriate tentative decisions from the previous signaling interval for feedback. Both the Qureshi and Eyuboglu schemes are capable of reducing the effects of channel distortion in coded systems relative to conventional linear equalization.

In data communication systems of the kind that have error-control decoders so-called interleaving schemes have been used to remove the effects of channel burst noise as described, for example by A. Viterbi and J. Omura in "Principles of Digital Communication and Coding", McGraw Hill Book Company, 1979, incorporated herein by reference. An interleaver rearranges the order of the symbols in an input sequence. A corresponding deinterleaver performs the inverse operation to recover the original sequence, but with the noise samples spread out.

One class of interleavers, called periodic interleavers, is disclosed in Forney, U.S. Pat. No. 3,652,998, issued March 1972, assigned to the same assignee as this application, and incorporated herein by reference.

SUMMARY OF THE INVENTION

A general feature of the invention is a communication system in which (1) a transmitter encodes data symbols into a sequence of signal points appearing in an original order which is then rearranged in a transmission order that differs from the original order, (2) a receiver derives a sequence of received signals consisting of signal points in the transmission order affected by distortion samples and then reorders the received signals so that the signal points are restored to the original order, and the order of the distortion samples is rearranged, (3) the receiver uses feedback values to modify at least some of the rearranged distortion-affected signal points to reduce their distortion samples, (4) the receiver makes a reliable non-final feedback decision for each distortion affected signal point after a delay of a non-zero number of signaling intervals and uses the non-final decisions as feedback to modify the rearranged received signals, and (5) the receiver also makes a final decision on each distortion-affected signal point after a delay of a non-zero number of signaling intervals.

Preferred embodiments of the invention include the following features. In the transmitter, a modular periodic interleaver rearranges the order of signal points for transmission by delaying successive signal points according to a periodic delay sequence, and, in the receiver, a deinterleaver in the form of a modular periodic interleaver restores the original order by delaying successive signal points according to a periodic delay sequence (e.g., 0, D, 2D,...) and thereby separates adjacent distortion components within a period by a predetermined number D of signaling intervals. The decoder is a (2-state) Viterbi algorithm decoding device which delivers sufficiently reliable non-final feedback decisions after a delay of D signaling intervals, and delivers final decisions after a delay of D' signaling intervals, where D' may be greater than D. The distortion samples in the transmission order are correlated noise samples and the decision feedback circuit is a decision feedback noise predictor. The decision feedback circuit includes a controller which supplies appropriate predictor coefficients every signaling interval. The encoder introduces dependencies between successive signal points. The decision feedback circuit includes lattice-type filters.

Because the average strength of the distortion components is reduced, decoding decisions are more reliable. Thus, the advantages of both decision feedback and maximum likelihood decoding are attained. The system is less complicated than the Qureshi and Eyuboglu techniques discussed above but in the new system the overall throughput delay between the communicating ports will increase as a result of the delays in the interleaver/deinterleaver pair. Thus, in applications where such additional delays can be tolerated this new technique will be preferred.

Other advantages and features of the invention will become apparent from the following description of the preferred embodiment, and from the claims.

DESCRIPTION OF THE PREFERRED EMBODIMENT

We first briefly describe the drawings.

Drawings

STRUCTURE AND OPERATION

Figure 1:
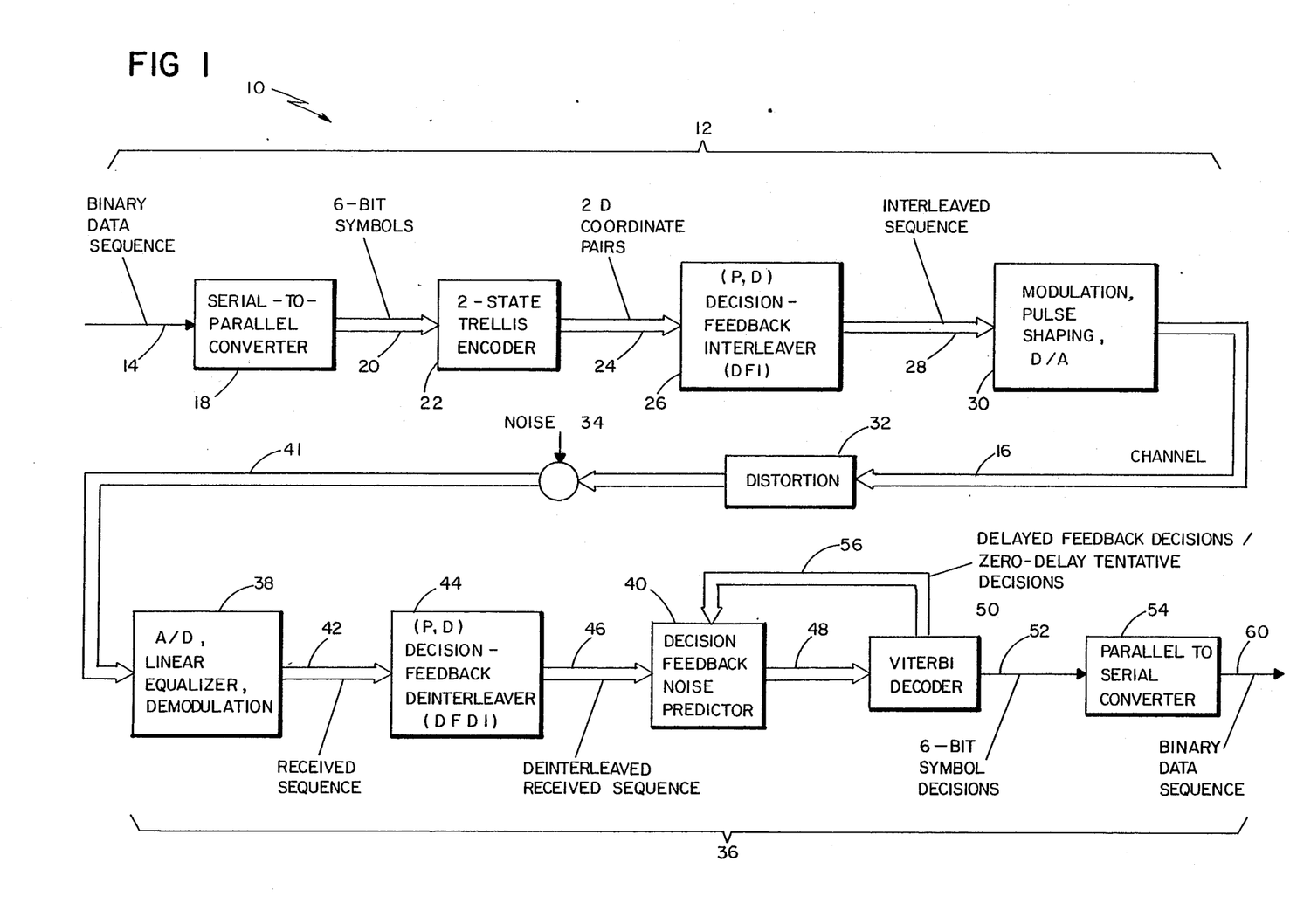
FIG. 1 is a block diagram of a communication system.

Referring to FIG. 1, in a coded transmission system 10, a transmitter 12 receives a binary data sequence 14 to be transmitted over a linear, bandlimited, distorting channel 16. Sequence 14 is delivered to a serial-to-parallel converter 18 which collects bits appearing in sequence 14 in symbols of 6 bits each, for transmission at a rate of 6 bits per signaling interval. The resulting sequence of 6-bit symbols 20 is encoded by a 2-state trellis encoder 22 (of the kind disclosed in Forney, U.S. Pat. No. 4,562,426, issued Dec. 31, 1985, assigned to the same assignee as this application, and incorporated herein by reference) into a sequence 24 of 2-dimensional coordinate pairs (in-phase and quadrature) representing a stream of signal points $S_1$, $S_2$, $S_3$... with dependencies being introduced between successive signal points. One signal point, $S_k$, is to be transmitted in the kth signaling interval.

The signal points from the trellis encoder 22 are passed through a so-called (P,D) decision-feedback interleaver (DFI) 26 (defined below) which rearranges (interleaves) the order of the signal points by delaying each signal point by a number of signaling intervals before releasing it. The resulting interleaved sequence 28 is then modulated, digital pulse-shape filtered, and digital-to-analog (D/A) converted 30 for delivery to the analog channel 16. The channel distorts (32) the transmitted signals, introducing intersymbol interference, and adds noise 34.

In receiver 36, the noise-affected received analog signal is analog-to-digital (A/D) converted, linear equalized (to remove intersymbol interference and to filter out-of-band noise), and demodulated 38 into a sequence of complex received signals 42 (at the rate of one signal per signaling interval) consisting of interleaved symbols and associated noise samples. The process of linear equalization introduces a correlation between successive received noise samples.

The received sequence 42 is fed into a so-called (P,D) decision-feedback deinterleaver (DFDI) 44 (defined below) which reorders (deinterleaves) the sequence of received signals, again, by delaying each received signal by an appropriate number of signaling intervals before releasing it such that the original order of the encoded signal points is recovered while successive noise samples are spread out. The resulting sequence 46 of received coordinate pairs is then modified in a decision-feedback noise predictor 40 similar to the kind used in conventional uncoded systems, which reduces the average noise strength and nearly eliminates the correlation between noise samples, by subtracting a current noise estimate. The noise estimate is based on a number of error signals which are obtained by subtracting delayed feedback decisions from the corresponding received signals (as described in more detail later on). The modified received sequence 48 at the output of predictor 40 is delivered to a conventional Viterbi algorithm decoder 50 (of the kind described in the Forney patent application incorporated by reference above) which estimates the sequence of signal points most likely to have been transmitted, delivering decisions after a final decision delay of D' signaling intervals, and decodes that sequence into a sequence of 6-bit symbols 52. Each 6-bit symbol 52 is converted into 6 successive bits in a parallel-to-serial converter 54 and the resulting sequence of bits 60 is delivered serially to the user. The Viterbi algorithm decoder also delivers delayed feedback decisions and zero delay tentative decisions 56 to the predictor 40.

The operation of interleaver 26 and deinterleaver 44 can be understood as follows.

As suggested in the Forney patent, incorporated by reference above, an interleaver can be described by a sequence of delays $d_0$, $d_1$, $d_2$, ..., representing the number of time units (i.e., signaling intervals) that successive input symbols are respectively held before they are delivered at the output of the interleaver. In a so-called periodic interleaver that sequence of delays is periodic with some period P. That is, input symbols that are separated by integer multiples of P time units (i.e., P, 2P, ...) will be delayed by the same number of time units. For example, in an interleaver of period of P=5 with a sequence of delays 0, 6, 2, 8, 4 the input sequence shown on the first line below will appear at the output in the form shown in the second line below $S_1\ S_2\ S_3\ S_4\ S_5\ S_6\ S_7\ S_8\ S_9\ S_{10}\ S_{11}\ S_{12}\ S_{13}\ S_{14}\ S_{15}\ S_{16}\ S_{17}\ S_{18}\ S_{19}$
$S_1 \ldots S_3\ S_6 \ldots S_2\ S_5\ S_8\ S_{11}\ S_4\ S_7\ S_{10}\ S_{13}\ S_{16}\ S_9\ S_{12}\ S_{15}.$ So-called modular periodic interleavers, defined in the Forney patent, have delays $0, D, 2D, \ldots, (P-1)D$ where $D>1$ is a delay parameter. The delays are ordered in a way that is characterized by an integer parameter m where 1. $1 \leq m < P$.
2. P and m are relatively prime (i.e., they have no common factor).
3. P and $mD+1$ are relatively prime.

The ordering of delays in a modular periodic interleaver is $r_0 D, r_1 D, \ldots, r_{p-1} D$, where $r_i$, $i=0, 1, \ldots, P-1$, are the remainders of the division $im/P$, $i=0, 1, \ldots, P-1$, respectively. Thus, a modular periodic interleaver can be conveniently represented by the three parameters (P,D,m). For example, the interleaver with delays 0, 6, 2, 8, 4 illustrated above is a (5,2,3) modular interleaver.

A subclass of modular periodic interleavers, to be called decision-feedback interleavers (DFIs), can now be defined. A decision-feedback interleaver (DFI) is described by two parameters (P,D) where D corresponds to the feedback delay in the decoder (i.e., the number of intervals of delay that characterize each feedback decision appearing on line 56). This delay will typically be smaller than the delay D' used for final decisions. In a (P,D) DFI the quantities P and $D+1$ are restricted to be relatively prime. This condition can be easily met in practice. Then, a (P,D) DFI can be defined as a (P,D,m) modular interleaver where $1 \leq m < P$ satisfies the equality $P-1 =$ remainder of $\{m.(D+1)/P\}$.

For example, a (5,2) DFI is the (5,2,3) modular interleaver discussed in the earlier example. The maximum delay in a (P,D) DFI is $(P-1)D$ time units (in the example the maximum delay is 8 time units).

The deinterleaver corresponding to a (P,D) DFI is a modular (P,D,1) interleaver. Thus, a decision-feedback deinterleaver (DFDI) has delays $0, D, 2D, \ldots, (P-1)D$ in that order also with a maximum delay of $(P-1)D$ time units. For example, in a (5,2) DFDI with delays 0, 2, 4, 6, 8 the input sequence shown in the first line below will be reordered according to the second line below $R_1\ R_2\ R_3\ R_4\ R_5\ R_6\ R_7\ R_8\ R_9\ R_{10}\ R_{11}\ R_{12}\ R_{13}\ R_{14}\ R_{15}$
$R_1 \ldots R_2 \ldots R_6\ R_3 \ldots R_7\ R_4\ R_{11}\ R_8\ R_5\ R_{12}\ R_9.$ However, to recover the original sequence, a DFDI has to be appropriately synchronized with the DFI. The desired synchronization is always such that a symbol that received a delay of r x D time units in the (P,D) DFI will receive a delay of $(P-1-r)D$ time units in the (P,D) DFDI. Therefore, the net effect of the DFI/DFDI system on the encoded signal points will be a constant total delay of $(P-1)D$ time units.

It should be emphasized that other types of interleavers could be used to obtain the effect (or a similar effect to the one) derived from periodic interleavers. Here periodic interleavers are preferred because they have small delay and are simple to implement.

To simplify the description, in the example here we first use a (5,2) DFI/DFDI pair and assume that feedback decisions are released after a delay of two signaling intervals (D=2). In practice, however, larger values of P and D may be needed. Later, the description of the noise predictor will be extended to arbitrary values of P and D.

Figure 2:
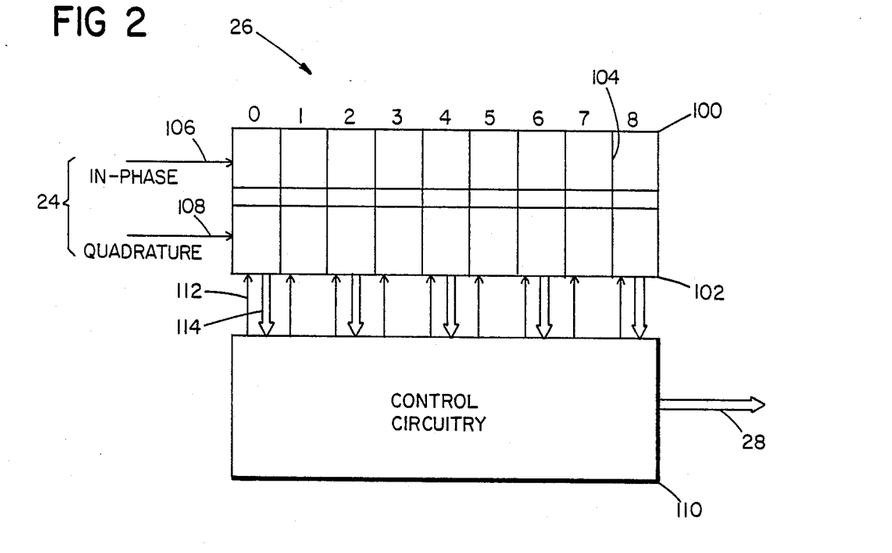
FIG. 2 is a block diagram of an interleaver.

The operation of a (5,2) DFI/DFDI pair can be described as follows. Referring to FIG. 2, (5,2) DFI 26 consists of two identical shift registers 100, 102 each of length 9, operating in synchronism. The two registers are connected to receive respectively the in-phase coordinate 106 and the quadrature coordinate 108 of each coordinate pair in sequence 24. The 9 different locations (e.g., 104) of the two registers 100, 102 are numbered 0 through 8 from left to right (as indicated by the numbers above register 100). The coordinates 106, 108 of the currently encoded coordinate pair are loaded into position 0, while the coordinates of the previous pair will be in position 1, and so on.

DFI 26 includes control circuitry 110 that is connected by control lines (e.g., 112) to the respective locations 104 in both registers to control the shifting of coordinates through the registers and the delivery of selected coordinate pairs over lines (e.g., 114) to control circuitry 110 for inclusion in interleaved sequence 28. In each signaling interval, the contents of each location 10 in each register will be shifted right by one position and the coordinates in the eighth position will be dropped, while new coordinates enter at position 0. One pair of coordinates will be drawn from a selected position of the shift registers in every signaling interval, the selected position reflecting the delay sequence of a (5,2) DFI. For example, in a first signaling interval of a block of 5 intervals the output coordinates will be taken from position 0, while in the next 4 signaling intervals they will be taken from positions 6, 2, 8, and 4, in that order. The location 104 of the coordinates to be drawn in a particular interval is indicated by a pointer that is updated by the control circuitry. The pointer goes back to position 0 every 5th signaling interval and is thereafter updated in the same manner.

Figure 3:
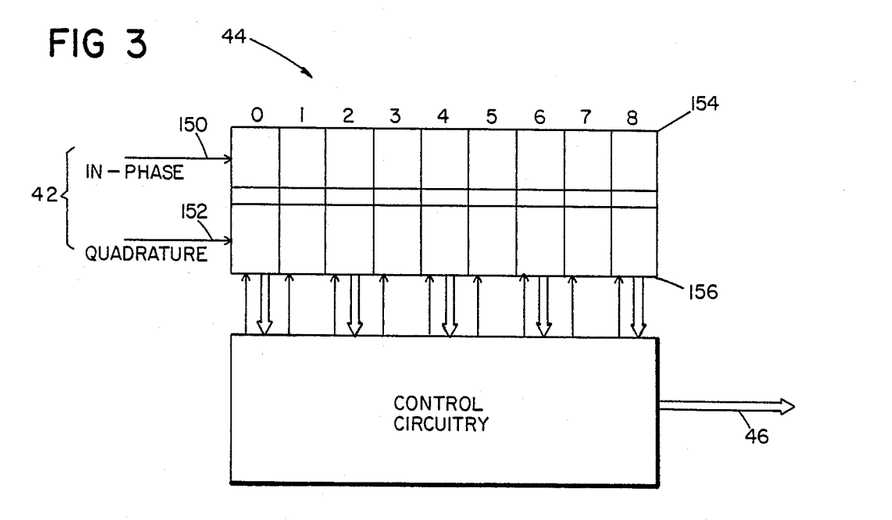
FIG. 3 is a block diagram of a deinterleaver.

Referring to FIG. 3, in receiver 36, the (5,2) DFDI 44 is implemented in a similar manner. The coordinate pairs 150, 152 in sequence 42 delivered from element 38 are fed into a pair of shift registers 154, 156 (again of length 9) and taken out periodically from positions 0, 2, 4, 6 and 8, in that order.

To reduce the storage requirements other approaches can be used to implement interleavers, as described, for example, in the Forney patent mentioned above. In high-speed voiceband modems which use programmable digital signal processors interleavers can be implemented using circular buffers and simple table look-up for the control circuitry.

The DFDI 44 is synchronized to the DFI 26 such that if a signal point is taken from position 0 at DFI 26 the corresponding received signal point will be taken out from position 8 of the DFDI. In voiceband modems, synchronization of the DFDI does not present any additional complexity, since synchronization is already achieved during the usual training mode where the transmitter 12 sends a sequence of internally generated signal points to initialize the receiver 36. Thus, the receiver 36 will know when the first data symbol is to appear in sequence 42 and will synchronize the DFDI 44 accordingly.

In the transmitter 12, DFI 26 will commence operation when the first signal point appears at the output of trellis encoder 22, and the first signal point will be transmitted without delay. The DFI shift registers can be initialized using training symbols. A few training symbols will then be transmitted in between a few initial signal points, a circumstance that can then be taken into account in the receiver 36 at the end of training.

In receiver 36, the DFDI 44 will commence operation when the first received signal appears at the output of element 38. The first 8 output signals will be discarded and then first the signal point in position 8 will be delivered to noise predictor 40.

In the process of reconstructing the original order of the encoded symbols, a DFDI rearranges the order of the noise samples such that successive noise samples will appear spread apart.

Figure 4:
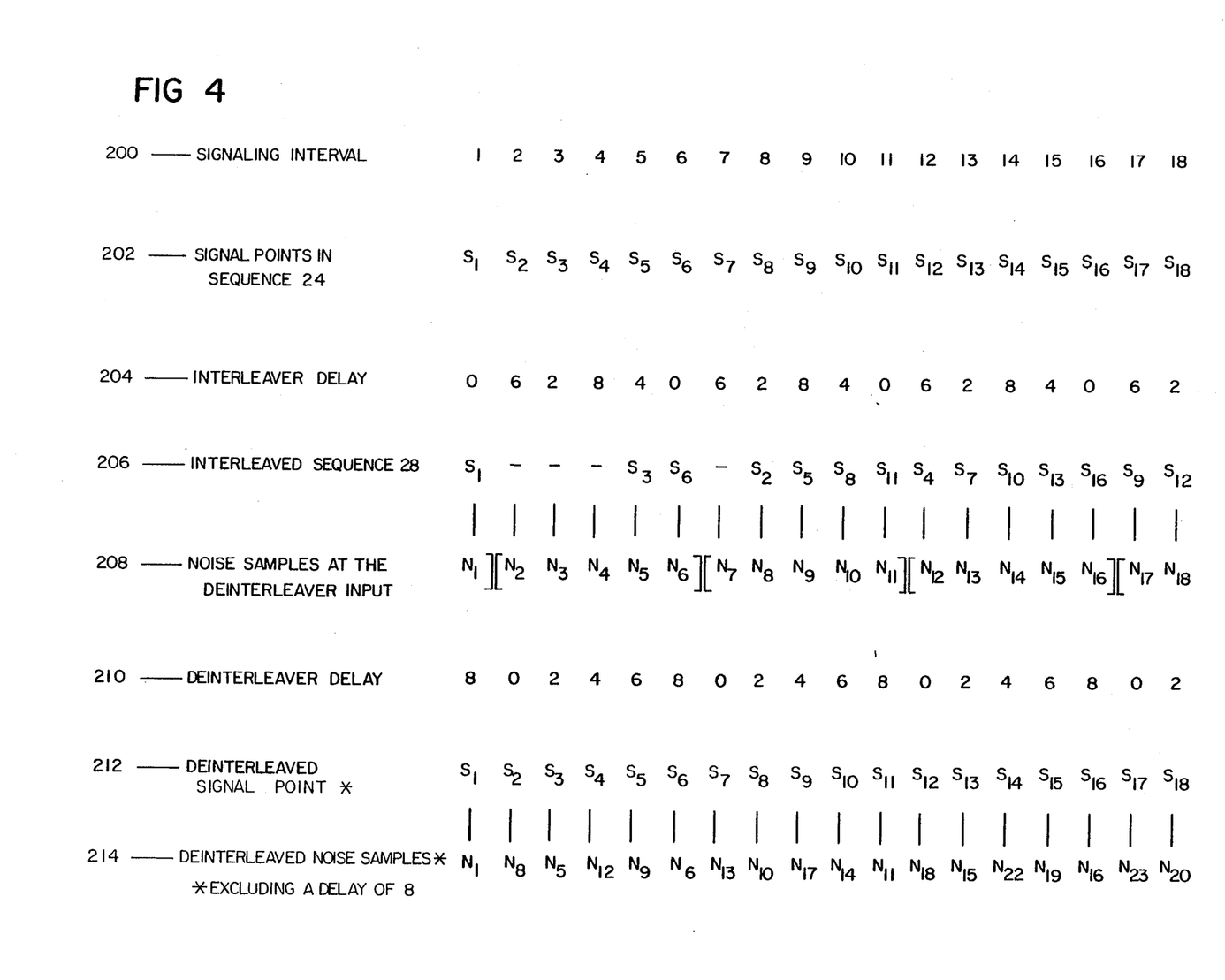
FIG. 4 is a chart of signal point sequences.

Referring to FIG. 4, in the particular case of the (5,2) DFI/DFDI pair, the spreading out of the noise samples can be illustrated as follows. The first row 200 in FIG. 4 indicates the index of each signaling interval measured either at the transmitter or the receiver, as the case may be. The second row 202 shows the signal points $S_k$ ($k=1, 2, \ldots$) in sequence 24 at the transmitter. The third row 204 indicates the length of the delays in the (5,2) DFI. The fourth row 206 shows the interleaved sequence 28 delivered by the interleaver. The fifth row 208 shows the successive noise samples that become associated with each of the respective transmitted signal points at the deinterleaver input. Here, we have divided the noise sequence into successive blocks of 5 noise signals for purposes of describing the noise spreading and prediction. Note that although the signal points are in interleaved order, the noise samples are in numerical order. The sixth row 210 shows the lengths of the delays in the deinterleaver. The last two rows 212, 214 show the sequence of received signals (each comprising a sent signal point and an associated noise sample) appearing at the output of the (5,2) DFDI excluding a delay of 8 signaling intervals. The received signals reflect the proper ordering of signal points $S_k$ but the ordering of noise samples is rearranged. Specifically, within each block shown in row 208, noise samples which are separated by n signaling intervals become separated by 3·n signaling intervals at the deinterleaver output. In particular, adjacent samples are separated by 3 intervals.

This spreading of the noise samples, by itself, reduces the effect of noise correlation on the Viterbi decoder 50 which is typically affected by correlation between closely located noise samples.

To describe the effect of the noise prediction, we will initially assume that a single coefficient is sufficient for the prediction of noise samples. Since adjacent received signals within a block are separated by 3 signaling intervals after deinterleaving, the decision corresponding to a received signal $R_k$ will be available before $R_{k+1}$ is fed into the decoder (assuming a delay of D=2), when $R_k$ and $R_{k+1}$ belong to the same block at the deinterleaver input (the $R_k'$'s correspond to the sums of entries in rows 206 and 208 of FIG. 4). Then the noise sample $N_{k+1}$ can be predicted based on $N_k$ using decision-feedback. Thus four out of every five noise samples can be predicted.

Figure 5:
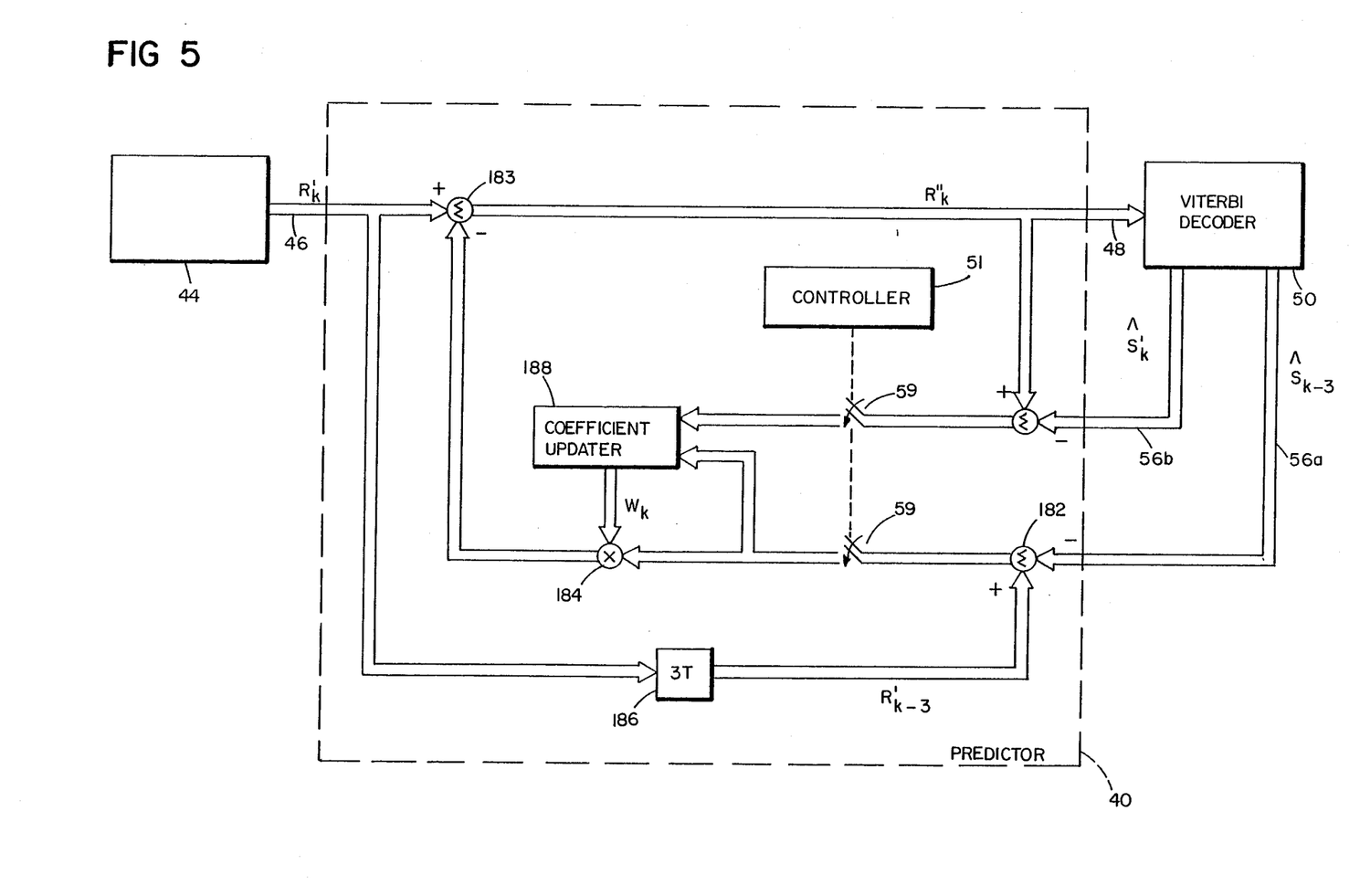
FIG. 5 is a block diagram of a single-coefficient predictor.

More specifically, referring to FIG. 5, the deinterleaved received signals in sequence 46 that are fed to predictor 40 will be denoted by $R'_k$, $k=1, 2, \ldots$, $R'_1$ being the first received signal released by the deinterleaver 38 (the $R_k''$'s correspond to the sums of entries in rows 212, 214 of FIG. 4). The first 3 received signals $R'_1$, $R'_2$ and $R'_3$ are delivered directly as $R''_1$, $R''_2$, $R''_3$ to the decoder 50 without any modification at adder 183 because the controller 51 keeps switches 59 open. This gives the decoder enough time to deliver feedback decisions with a delay D=2. Then, in every subsequent block of 5 received signals $R'_k$, all except the first signal in the block is modified (using decision-feedback) by adders 182, 183, multiplier 184, and three-interval delay 186 according to $$R''_k = R'_k - [R'_{k-3} - \hat{S}_{k-3}]W_k, \ k > 3, \ k \neq 4, 9, 14, \ldots,$$

where $\hat{S}_{k-3}$ is the feedback decision corresponding to $R'_{k-3}$ and $W_k$ is a complex predictor coefficient. The feedback decision $\hat{S}_{k-3}$ is made by the Viterbi decoder 50 and delivered over line 56 as will be described later. Using the controller 51, the first signals in each block are fed into the decoder without any modification, i.e., $$R''_k = R'_k, \ k=1, 2, 3, 4, 9, 14, \ldots$$

Decoder 50 receives sequence 48 and determines which sequence of signal points was the most likely to have been sent. Decoder 50 maintains a path history of prior signal points ending in each of the possible two states occupied in a current signaling interval, and a path metric for each of the two path histories. In each succeeding signaling interval, the path histories are extended based on branch metrics corresponding to the current interval. The decoder, in each signaling interval k, returns to predictor 40, the two interval delay feedback decision $\hat{S}_{k-2}$ to be used in the next signaling interval. The value $\hat{S}_{k-2}$ is the signal point that lies two intervals earlier on the current path history which has the smaller path metric. This value will be used in the next signaling interval, k+1, as a feedback decision to predict the distortion sample of the received signal $R'_{k+1}$. Every signaling interval, the decoder also returns a zero interval delay tentative decision $\hat{S}'_k$ on line 56b to be used in the coefficient update 188 to update the predictor coefficient $W_k$ according to $$\begin{aligned}W_{k+1} &= W_k - \Delta(R'_{k-3} - \hat{S}_{k-3})(R''_k - \hat{S}'_k)^*, \\ &\quad k > 3 \ k \neq 4, 9, 14, \ldots, \\ &= W_k, \text{ otherwise,}\end{aligned}$$

where $\Delta$ is a positive step size and * represents the complex conjugate. The value $\hat{S}'_k$ can be obtained by simple slicing with respect to the current received signal point. Slicing can also be used at the deinterleaver input, to obtain the zero interval delay tentative decisions for updating the linear equalizer and the phase-locked loop (not shown) used in the demodulator.

The initial value $W_0$ of the predictor coefficient can be determined during the training of the modem or can be arbitrarily set to zero.

Decoder 50 also delivers final decisions over line 52 (FIG. 1) with a delay of, e.g., 16 signaling intervals. The final decisions are also taken from the current path history which has the smaller path metric.

Now, we can describe how decision-feedback equalization is achieved for arbitrary values of P, D and K, where K is the desired number of predictor coefficients.

Here, without losing much generality, we will assume that $P > K$.

Referring to FIG. 1, we consider successive blocks of P received signals in sequence 41 at the deinterleaver input, where in each block $$[R_i, R_{1+1}, \ldots, R_{1+k}, \ldots, R_{i+p-1}],$$

the first signal $R_i$ receives no delay in the deinterleaver while subsequent signals receive delays $D, 2D, \ldots, (P-1)D$. Signals within a block appear at the output of the deinterleaver in the form $$R_i \ldots R_{i+1} \ldots R_{i+2} \ldots R_{i+K} \ldots R_{i+P-1}$$
$$\quad\quad\; D \quad\quad\;\; D$$
$$\quad\; \text{signals} \quad \text{signals}$$

with a separation of $D+1$ signaling intervals between adjacent received signals from sequence 41, and D signals from previous or future blocks placed in between. This implies that before the signals $R_{i+k}, \ldots, R_{i+p-1}$ are fed into the decoder, the delayed feedback decisions corresponding to K most recent signals will be available. Therefore, their noise variables $N_{i+k}, \ldots, N_{i+p-1}$ can be predicted with a K'th order predictor. For received signals $R_{i+q}$, $q=1, \ldots, K-1$, however, only the decisions corresponding to q most recent signals $R_i, \ldots, R_{i+q-1}$ are guaranteed to be available for feedback. Only if $n-(P-n)D>D$ can a feedback decision with delay D be used to predict a noise variable in a current block based on a noise variable from a previous block, where $0<n<J<P$ is the separation between these variables (before deinterleaving).

However, when $K<D$ (as would typically be the case in practice), this can never be possible and only a q'th order predictor can be used to predict noise variables $N_{q+1}$, $q=1, \ldots, K-1$ and $N_i$ cannot be predicted. According to the discussion above, signals $R'_k$ in the received sequence 46 at the deinterleaver output will be modified in the noise predictor 40 according to $$R''_k = R'_k - \sum_{q=1}^{K_k} [R'_{k-qD-1} - \hat{S}_{k-qD-1}] W_{q,Kk}(n)$$

where $K_k$ is the order of prediction for the k'th noise variable $N'_k$ (corresponding to $R'_k$), $W_{q,Kk}(n)$, $q=1, \ldots, K_k$, is the current value of the q'th predictor coefficient for the predictor of order $K_k$ and $\hat{S}_{k-q.D-1}$ is the delayed feedback decision corresponding to $R'_{k-q.D-1}$, obtained from the decoder in the same manner as described before. The delay for the decision $\hat{S}_{k-q.D-1}$ can be fixed as D or it can be q.D, when $q>1$. The latter yields more reliable decisions at the expense of some increase in complexity.

Note that K sets of predictor coefficients (for predictors of order 1 through K) are needed for implementation. However, only one set will be used in a given signaling interval and a simple controller is needed to provide the appropriate coefficients to the predictor depending on the signaling interval index K. Here, we should point out that in most applications small values of K are sufficient to obtain most of the gain of a DFE. For example, in voiceband data transmission systems a first-order predictor can be sufficient even at relatively high signaling rates around 2800 symbols/sec. Furthermore, it is desirable to assume K quite small to limit the effects of error propagation.

The interleaving technique is particularly suitable for the predictor-form DFE, since the same feedforward equalizer can be used independent of the number of feedback coefficients. In a conventional-form DFE, however, the feedforward filter coefficients would also depend on the signaling interval. Specifically, $K+1$ different sets of feedforward coefficients would be needed. But, we should point out, that at least in principle, the interleaving technique also applies to conventional-form DFE's.

Figure 6:
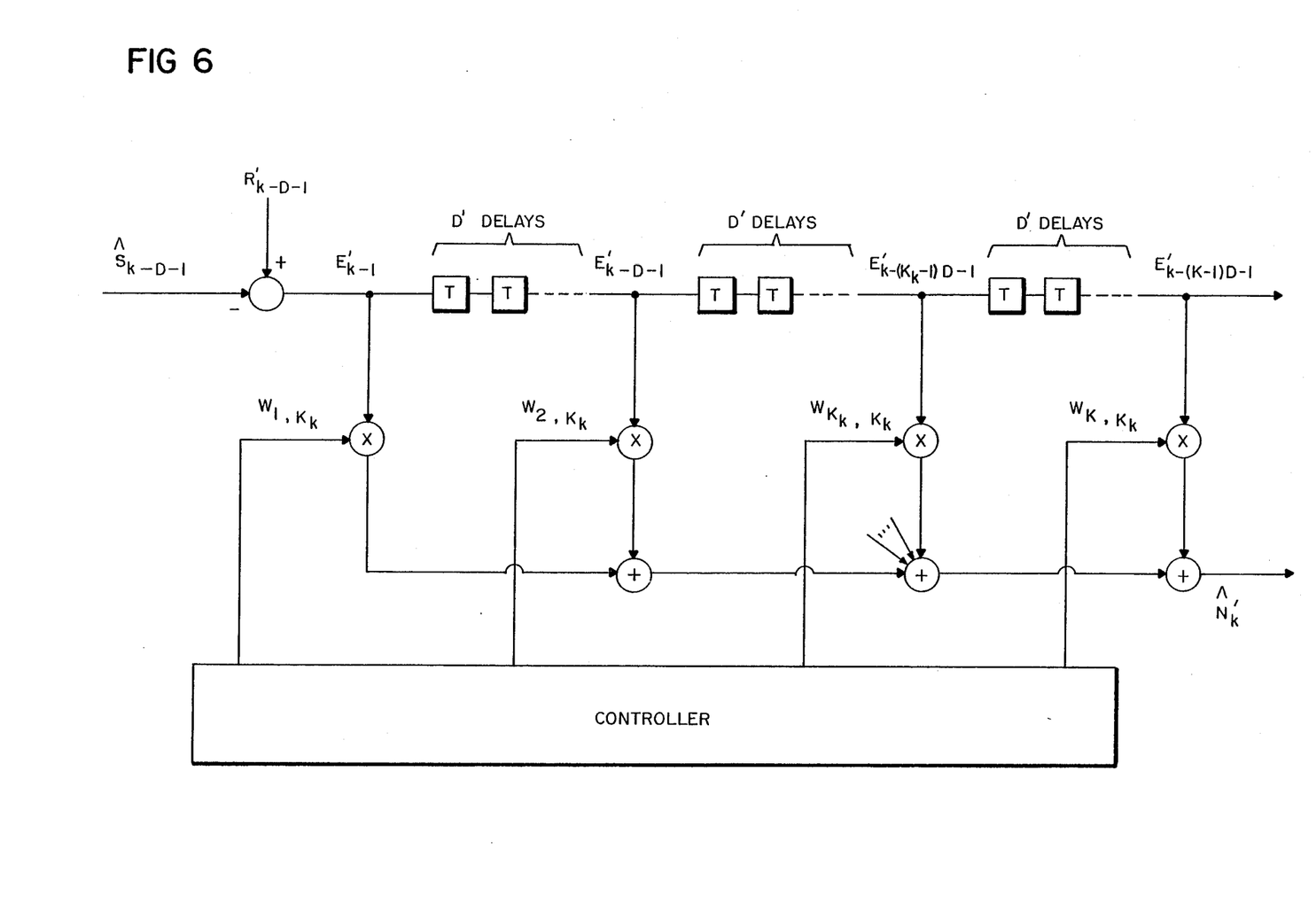
FIG. 6 is a block diagram of a generalized predictor.

A more general block diagram of the predictor (for fixed feedback delay D) is shown in FIG. 6. Here, error signals $$E'_{k-j} = R'_{k-D-j} - \hat{S}_{k-D-j}, \; j=1, \ldots, (K-1)D+1$$

are stored in a tapped delay line (TDL) of length $(K-1)D+1$ with K taps located at positions $(q-1).D$, $q=1, \ldots, K$. Every signaling interval, a predictor output $\hat{N}'_k$ is obtained using the coefficients supplied by the controller. The decoder input $R''_k$ is then generated according to $$R''_k = R'_k - \hat{N}'_k.$$

The adaptive update can be made using the least mean-square (LMS) algorithm where one set of coefficients is updated each signaling interval. At the end of the k'th interval the coefficients for the predictor of order $K_k$ can be updated according to $$W_{q,Kk}(n+1) = W_{q,Kk}(n) - \alpha_{Kk} E'^*_{k-(Q-1)D-1}(R''_k - \hat{S}_k), \; q=1, \ldots, K_k$$

where $\hat{S}'_k$ is a zero interval delay tentative decision corresponding to $R''_k$ and $\alpha_{Kk}$'s are appropriately chosen step sizes.

It should be apparent that for fixed feedback delay D the performance of our system will improve with increasing P, as more and more noise variables can be predicted with a K'th order predictor. If we neglect decision errors, then in the limit as $P \to \infty$, the performance will approach the performance of a perfect DFE. Similarly, for fixed P, the performance will improve as D is increased towards the delay used for final decisions. Of course, increasing P or D will also increase the total delay introduced by the interleaver/deinterleaver pair. Therefore, a compromise needs to be made between the introduced delay and decoder performance.

The performance advantage of this system will depend upon the channel characteristics and the signaling rate. In typical high-speed voiceband transmission systems a SNR improvement of 1.0–2.0 dB can be obtained with just one predictor coefficient and a moderately long period P (around 5–10).

It is possible to improve the performance of our system by basing the estimates of (certain) current noise variables not only on past noise variables but also on future variables (which occur after the current variable at the deinterleaver input). This way, the average noise strength can further be reduced (without increasing the delay in the interleavers).

Consider successive blocks of P received signals at the input of the (P,D) DFDI, i.e., $$\ldots [R_i, \ldots, R_{i+P-1}][R_{i+P}, \ldots, R_{i+2P-1}][R_{i+2P} \ldots R_{i+3P-1}] \ldots,$$

where $R_i, \ldots, R_{i+p}, \ldots$ etc. receive no delay in the deinterleaver. Next, consider two received signals $R_k$ and $R_{k+m}$ which belong to consecutive blocks and which are separated by m signaling intervals, where $0 < m < K < P$. Then, at the deinterleaver output $R_{k+m}$ will occur more than D signaling intervals before $R_k$, provided $$P \geq (m+1)(1+1/D).$$

Thus, the noise variable $N_k$ (corresponding to $R_k$) can be estimated based on the variable $N_{k+m}$ (corresponding to $R_{k+m}$) using decision-feedback since the delayed decision corresponding to $R_{k+m}$ will be available before $R_k$ is fed into the decoder. In particular, if $P > K+2$ and $D \geq K$ (as would typically be the case), a noise variable $N_k$ can be estimated based on $N_{k+m}$, $0 < m < K < P$, whenever these variables belong to consecutive blocks. For example, referring to FIG. 4, where a (5,2) DFI/DFDI pair is used, the noise variables $N_6$, $N_{11}$, $N_{16}$, ... etc., appearing at the end of the 5-sample blocks shown in the fifth row 208 (FIG. 4), can be estimated based on the past variables $N_5$, $N_{10}$, $N_{15}$, etc., as well as on the future variables $N_7$, $N_{12}$, $N_{17}$, etc., respectively. The implementation of the noise estimator is in principle similar to the description given in the main embodiment.

The interleavers could be so-called block interleavers of the kind which have been used in other applications of interleaving to coded systems. In a typical implementation of a [M,L]block interleaver the input sequence is divided into blocks of length M×L. The symbols in each block are read row-by-row into a two-dimensional array of M rows and L columns and read out column by column. The inverse operation is done by the deinterleaver which is implemented as an appropriately synchronized [L,M]interleaver.

An effect similar to that derived from a periodic (P,D) DFI/DFDI pair can be obtained using block interleavers with $L = D+1$ and $M = P$. However, the total delay with block interleavers is $2(P-1)D$; i.e., twice the delay of periodic interleavers. Therefore, in practice periodic interleavers would generally be preferred.

The invention can also be applied with higher dimensional codes (e.g., of the kind disclosed in Wei, U.S. Pat. No. 4,713,817, issued Dec. 15, 1987 and incorporated herein by reference)×and block-type codes.

It is also possible to use lattice-type filters in the implementation of the decision feedback equalizer, in accordance with the discussion in Adaptive Filters: Structures, Algorithms and Applications, Michael L. Honig, David G. Messerschmitt, Kluwer Academic Publishers, 1984. In certain situations these can simplify the implementation since their coefficients do not change with the order of the filter.

Other embodiments are within the following claims.

1. A communication system comprising a transmitter having
   means for encoding data symbols as a sequence of signal points appearing in an original order, and
   a modular periodic interleaver for rearranging said signal points for delivery in a transmission order that differs from said original order,
   a receiver having means for deriving a sequence of received signals comprising signal points in said transmission order affected by error amounts induced by chanel noise and distortion,
   a modular periodic deinterleaver having a periodic delay sequence 0,D, 2D, . . . , 0,D, 2D, . . . , for reordering said received signals so that said signal points are restored to said original order, and the order of said error amounts is rearranged,
   a decoder for making a single reliable non-final feedback decision on each said error-affected signal point in said restored original order, after a decoder delay of a predetermined non-zero number of signaling intervals, said decoder also making a final decision on each said error-affected signal point after a delay of a non-zero number of signaling intervals, and
   a decision feedback circuit for modifying at least some of said error-affected signal points in said restored order prior to delivery to said decoder, each said signal point being modified in accordance with a feedback value that is based on at least one said feedback decision said decision feedback circuit providing a single modified version of a given said error-affected signal point.

2. The system of claim 1 wherein said decoder makes a final decision on each said error-affected signal point after a non-zero delay D'.

3. The system of claim 2 wherein said final decision delay (D') is larger than said decoder delay of said non-final feedback decision.

4. The system of claim 3 wherein said feedback decision delay is at least one signaling interval.

5. The system of claim 1 wherein said decoder comprises a Viterbi algorithm decoding device.

6. The system of claim 5 wherein said Viterbi algorithm decoding device is a two-state trellis decoding device.

7. A communication system comprising a transmitter having
   means for encoding data symbols as a sequence of signal points appearing in an original order, and
   means for rearranging said signal points for delivery in a transmission order that differs from said original order,
   a receiver having means for deriving a sequence of received signals comprising signal points in said transmission order affected by error amounts induced by channel noise and distortion,
   means for reordering said received signals so that said signal points are restored to said original order, and the order of said error amounts is rearranged,
   a decoder for making a single reliable non-final feedback decision on each said error-affected signal point in said restored original order, after a decoder delay of a predetremined non-zero number of signaling intervals, said decoder also making a final decision on each said error-effected signal point after a delay of a non-zero number of signaling intervals, and
   a decision feedback circuit for modifying at least some of said error-affected signal points in said restored order prior to delivery to said decoder, each said signal point being modified in accordance with a feedback value that is based on at least one said reliable non-final feedback decision, said decision feedback circuit providing a single modified version of a given said error-affected signal point; and wherein said decision feedback circuit includes a decision feedback noise predictor in which estimates of current said error amounts are generated based on weighted sum of differences between said non-final feedback decisions and corresponding received signals.

8. The system of claim 7 wherein said means for rearranging comprises an interleaver, and said means for reordering comprises a deinterleaver.

9. The system of claim 7 wherein said decision feedback circuit includes a controller which supplies appropriate predictor coefficients for determining said weighted sum every signaling interval.

10. The system of claim 1 or 7 wherein said encoder means introduces dependencies between successive signal points.

11. The system of claim 1 or 7 wherein said decision feedback circuit includes lattice-type filters.

* * * * *

UNITED STATES PATENT AND TRADEMARK OFFICE
CERTIFICATE OF CORRECTION

PATENT NO. : 4,833,693

DATED : May 23, 1989

INVENTOR(S) : Vedat M. Eyuboglu

It is certified that error appears in the above-identified patent and that said Letters Patent is hereby corrected as shown below:

On the title page, OTHER PUBLICATIONS, Forney, line 2, "vol," should be --vol.--

OTHER PUBLICATIONS, Falconer, line 4, "1" should be --,--

Figure 4, left-top, number "24" is almost illegible due to poor print quality.

Col. 3, line 9, "formof" should be --form of--

Col. 5, line 6, "$S_1 \ldots S_3 \; S_6 \ldots S_2$" should be --$S_1 \ldots S_3 \; S_6 \cdot S_2$--

Col. 5, line 40, "m.(D+1)" should be --m $\cdot$ (D+1)--

Col. 5, line 56, "$R_1 \ldots R_2 \ldots R_6 \; R_3 \ldots R_7$" should be --$R_1 \ldots R_2 \cdot R_6 \; R_3 \cdot R_7$--

Col. 6, line 29, "10" should be --104--

Col. 7, line 47, "3.n" should be --3 $\cdot$ n--

Col. 8, line 3, "$R_k$''s" should be --$R_K'$ 's--

Col. 8, line 25, patent has not preserved spacing found in the application.

Col. 8, line 50, patent has not preserved spacing found in the application.

Col. 8, line 57, "equializer" should be --equalizer--

Col. 9, lines 14-16, formula should be: --

$$\underbrace{R_i \ldots\ldots}_{D \text{ signals}} \underbrace{R_{i+1} \ldots\ldots}_{D \text{ signals}} R_{i+2} \ldots\ldots\ldots R_{i+K} \ldots\ldots\ldots R_{i+P-1}$$

--

Col. 9, line 24, "$N_{i+k}, \ldots ,$" should be --$N_{i+k}, \ldots. ,$--

UNITED STATES PATENT AND TRADEMARK OFFICE
CERTIFICATE OF CORRECTION

PATENT NO. : 4,833,693

DATED : May 23, 1989

INVENTOR(S) : Vedat M. Eyuboglu

It is certified that error appears in the above-identified patent and that said Letters Patent is hereby corrected as shown below:

Col. 9, line 32, "$0<n<J\ P$" should be --$0<n\leq J\ P$--.

Col. 9, line 34, "$K<D$" should be --$K\leq D$--

Col. 9, line 43, "$W_{q,kk}(n)$" should be --$W_{q,K_k}(n)$--

Col. 9, line 45, "$W_{q,kk}(n)$" should be --$W_{q,K_k}(n)$--

Col. 9, line 47, "$_{k-q.D-1}$" should be --$_{k-q\cdot D-1}$--

Col. 9, line 48, "$_{k-q.D-1}$" should be --$_{k-q\cdot D-1}$--

Col. 9, line 50, "$_{k-q.D-1}$" should be --$_{k-q\cdot D-1}$--

Col. 9, line 51, "$q.D$" should be --$q\cdot D$--

Col. 10, line 16, "$(q-1).D$" should be --$(q-1)\cdot D$--

Col. 10, line 30, formula should be

--$W_{q,K_k}(n+1) = W_{q,K_k}(n) - \alpha_{K_k} \cdot E'^{*}_{k-(q-1)D-1} \cdot (R''_k - \hat{S}'_k),\ q=1,\ldots,K_k$--

Col. 10, line 33, "$_{kk}$s" should be --$K_k$'s--

Col. 10, line 64, in third set of brackets, "$R_{i2p}$" should be --$R_{i+2p}$--

Col. 11, line 3, "$0<m<K<P$" should be --$0<m\leq K<P$--

Col. 11, line 14, "$0<m<$" should be --$0<m\leq$--

Col. 11, line 28, "[M,L]block" should be --[M,L] block-- col. 11, line 34, "[L,M]interleave" should be --[L,M] interleave--

UNITED STATES PATENT AND TRADEMARK OFFICE
CERTIFICATE OF CORRECTION

PATENT NO. : 4,833,693

DATED : May 23, 1989

INVENTOR(S) : Vedat M. Eyuboglu

It is certified that error appears in the above-identified patent and that said Letters Patent is hereby corrected as shown below:

Col. 11, line 65, "chanel" should be --channel--

Signed and Sealed this

Fourth Day of September, 1990

Attest:

HARRY F. MANBECK, JR.

*Attesting Officer*     *Commissioner of Patents and Trademarks*